(12) United States Patent
Ishida

(10) Patent No.: US 8,369,637 B2
(45) Date of Patent: Feb. 5, 2013

(54) IMAGE PROCESSING APPARATUS, IMAGE PROCESSING METHOD, AND PROGRAM

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/756,289

(22) Filed: Apr. 8, 2010

(65) Prior Publication Data

US 2010/0266209 A1    Oct. 21, 2010

(30) Foreign Application Priority Data

Apr. 16, 2009  (JP) ................................ 2009-100189

(51) Int. Cl.
  *G06K 9/36*   (2006.01)
  *G06K 9/46*   (2006.01)
(52) U.S. Cl. ........................................ 382/243; 382/166
(58) Field of Classification Search .......... 382/190–208, 382/166, 232–253
  See application file for complete search history.

(56) References Cited

U.S. PATENT DOCUMENTS

| | | | | |
|---|---|---|---|---|
| 5,051,930 A * | 9/1991 | Kuwabara et al. | ............ | 715/207 |
| 5,065,437 A * | 11/1991 | Bloomberg | .................... | 382/176 |
| 5,107,345 A * | 4/1992 | Lee | ................. | 382/250 |
| 5,386,483 A * | 1/1995 | Shibazaki | ..................... | 382/162 |
| 5,452,104 A * | 9/1995 | Lee | ........................... | 358/426.14 |
| 5,664,031 A * | 9/1997 | Murai et al. | ................... | 382/317 |
| 5,680,479 A * | 10/1997 | Wang et al. | .................... | 382/176 |
| 5,917,947 A | 6/1999 | Ishida et al. | .................. | 382/232 |
| 5,920,655 A * | 7/1999 | Makita et al. | .................. | 382/272 |
| 5,933,249 A | 8/1999 | Shimura et al. | ............... | 358/429 |
| 6,931,591 B1 * | 8/2005 | Brown et al. | ................. | 715/205 |
| 7,158,669 B2 * | 1/2007 | Tanaka et al. | ................. | 382/166 |
| 7,170,647 B2 * | 1/2007 | Kanatsu | ........................ | 358/453 |
| 7,184,589 B2 * | 2/2007 | Okubo | .......................... | 382/166 |
| 7,366,357 B2 * | 4/2008 | Curry et al. | .................... | 382/243 |
| 7,532,757 B2 * | 5/2009 | Yoshida et al. | ............... | 382/180 |
| 7,623,712 B2 * | 11/2009 | Dai et al. | ...................... | 382/180 |
| 7,693,328 B2 * | 4/2010 | Moritani | ....................... | 382/166 |
| 7,747,077 B2 * | 6/2010 | Murakami | .................... | 382/180 |
| 7,929,757 B2 * | 4/2011 | Kishi | ............................ | 382/166 |
| 8,045,801 B2 * | 10/2011 | Kanatsu | ........................ | 382/176 |
| 8,050,499 B2 * | 11/2011 | Kanatsu | ........................ | 382/173 |
| 8,132,097 B2 * | 3/2012 | Angell | .......................... | 715/243 |
| 2002/0025072 A1 * | 2/2002 | Yamaai | ......................... | 382/199 |
| 2002/0085243 A1 * | 7/2002 | Kanatsu | ........................ | 358/453 |
| 2002/0085755 A1 * | 7/2002 | Chi et al. | ...................... | 382/176 |

(Continued)

FOREIGN PATENT DOCUMENTS

JP   2004-265384 A   9/2004
WO   2004/068368 A1   8/2004

*Primary Examiner* — Wenpeng Chen
*Assistant Examiner* — Feng Niu
(74) *Attorney, Agent, or Firm* — Fitzpatrick, Cella, Harper & Scinto

(57) ABSTRACT

The present invention provides an image processing apparatus which able to shorten processing time and includes an image inputting unit that inputs an image, a region division unit that generates region information by dividing an input image input by the image inputting unit into regions having a plurality of different types of attributes, including a frame region attribute, a non-frame region processing unit that obtains data of respective regions other than frame regions by applying attribute-specific processing for respective regions, excluding frame regions, included in the input image on the basis of the input image and the region information, and executes processing of filling of the processed regions, and a frame region processing unit that executes reduction processing and vectorization processing for the frame region according to the region size of the frame region.

10 Claims, 7 Drawing Sheets

U.S. PATENT DOCUMENTS

| | | | |
|---|---|---|---|
| 2002/0106124 A1* | 8/2002 | Wang | 382/173 |
| 2003/0202707 A1* | 10/2003 | Thyagarajan et al. | 382/239 |
| 2003/0210803 A1* | 11/2003 | Kaneda et al. | 382/100 |
| 2004/0223197 A1 | 11/2004 | Ohta et al. | 358/538 |
| 2005/0163389 A1* | 7/2005 | Ohmi et al. | 382/253 |
| 2005/0235201 A1* | 10/2005 | Brown et al. | 715/517 |
| 2006/0008114 A1* | 1/2006 | Sekiguchi et al. | 382/100 |
| 2006/0045386 A1 | 3/2006 | Fukuoka et al. | 382/305 |
| 2006/0133671 A1* | 6/2006 | Kanatsu | 382/181 |
| 2007/0127771 A1* | 6/2007 | Kaneda et al. | 382/100 |
| 2007/0133031 A1* | 6/2007 | Takaragi et al. | 358/1.13 |
| 2007/0230810 A1* | 10/2007 | Kanatsu | 382/243 |
| 2007/0286478 A1* | 12/2007 | Kishi | 382/162 |
| 2008/0304751 A1* | 12/2008 | Hayasaki | 382/195 |
| 2008/0310730 A1* | 12/2008 | Hayasaki | 382/195 |
| 2009/0249195 A1* | 10/2009 | Angell | 715/243 |
| 2009/0274363 A1* | 11/2009 | Dai | 382/164 |
| 2009/0285479 A1* | 11/2009 | Hosaki | 382/166 |
| 2009/0316219 A1* | 12/2009 | Ohashi | 358/450 |
| 2009/0324065 A1* | 12/2009 | Ishida et al. | 382/164 |
| 2010/0017705 A1* | 1/2010 | Sato | 715/243 |
| 2010/0021059 A1* | 1/2010 | Ito | 382/173 |
| 2010/0097656 A1* | 4/2010 | Misawa et al. | 358/2.1 |
| 2010/0172595 A1* | 7/2010 | Tsunematsu | 382/258 |
| 2010/0202025 A1* | 8/2010 | Ito et al. | 358/448 |

* cited by examiner

FIG.7

| | PROCESSING STATUS | ATTRIBUTE | x COORDINATE VALUE OF UPPER-LEFT CORNER OF REGION | y COORDINATE VALUE OF UPPER-LEFT CORNER OF REGION | x COORDINATE VALUE OF LOWER-RIGHT CORNER OF REGION | y COORDINATE VALUE OF LOWER-RIGHT CORNER OF REGION |
|---|---|---|---|---|---|---|
| 0 | PROCESSED | TEXT | $x_{00}$ | $y_{00}$ | $x_{01}$ | $y_{01}$ |
| 1 | UNPROCESSED | FRAME | $x_{10}$ | $y_{10}$ | $x_{11}$ | $y_{11}$ |
| 2 | PROCESSED | GRAPHICS | $x_{20}$ | $y_{20}$ | $x_{21}$ | $y_{21}$ |
| 3 | UNPROCESSED | PHOTO | $x_{30}$ | $y_{30}$ | $x_{31}$ | $y_{31}$ |
| 4 | UNPROCESSED | GRAPHICS | $x_{40}$ | $y_{40}$ | $x_{41}$ | $y_{41}$ |
| 5 | PROCESSED | FRAME | $x_{50}$ | $y_{50}$ | $x_{51}$ | $y_{51}$ |
| 6 | : | : | : | : | : | : |
| 7 | PROCESSED | GRAPHICS | $x_{70}$ | $y_{70}$ | $x_{71}$ | $y_{71}$ |

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program.

2. Description of the Related Art

The digitization of information is advancing in recent years, and systems are increasingly prevalent wherein paper documents are not stored as-is, but instead digitized by scanning using a scanner or similar device, with the resulting electronic data being stored or sent to another apparatus. In order to reduce transmission costs, high compressibility is demanded of digitized document images. Also demanded are reusability enabling partial editing of document images, as well as high image quality wherein image quality is not lost after enlarging or reducing document images.

However, when text regions and photo regions are mixed within a document image, applying compression suited to text regions results in good image quality but with a lower compression ratio. Meanwhile, applying compression suited to photo regions results in a high compression ratio, but with less-readable text. Consequently, the related art divides digitized document images into text regions and photo regions, and converts the text regions into vector data, where reusability and high image quality are emphasized. The related art then uses JPEG to compress the remaining photo and other regions that cannot be easily reproduced by vectorization, and then synthesizes and outputs the compressed results for the respective regions. In so doing, the related art realizes highly compressible and reusable document images with high image quality (see Japanese Patent Laid-Open No. 2004-265384).

In many cases, a region enclosed by a large frame taking up either approximately a fourth or over half of the total area of a document image (hereinafter also referred to as the large frame region) contains within it many graphics vectorization regions. Herein, such graphics vectorization regions are graphics regions targeted for vectorization.

When a plurality of graphics vectorization regions overlap, handling the partial overlaps of the target regions becomes difficult if each of the plurality of target regions is separately processed as a graphics vectorization region. Consequently, in such cases, the plurality of graphics vectorization regions are synthesized into a large, all-containing region. Vectorizing such a large, synthesized graphics vectorization region is easier.

However, if the entire plurality of graphics vectorization regions within the large frame region are treated as a single graphics vectorization region, then the region to be vectorized becomes too large, and the time required to process each image becomes extremely long. In order to resolve such increases in processing time, it is conceivable to reduce the graphics vectorization region before vectorizing. However, in this case, the image quality is degraded for the comparatively small graphics vectorization region contained within the large frame region. Furthermore, when enlarging the graphics vectorization region, insufficient memory or limitations on processing time may result in only a portion of the graphics vectorization region within the large frame region being processed.

In light of the foregoing problems, it is desirable to provide an image processing apparatus able to shorten processing time.

SUMMARY OF THE INVENTION

In order to solve the foregoing problems, an image processing apparatus in accordance with an embodiment of the present invention includes: an image inputting unit that inputs an image, a region division unit that generates region information by dividing an input image input by the image inputting unit into regions having a plurality of different types of attributes, including a frame region attribute, a non-frame region processing unit that obtains data of respective regions other than frame regions by applying attribute-specific processing for respective regions, excluding frame regions, included in the input image on the basis of the input image and the region information, and executes processing of filling of the processed regions, and a frame region processing unit that executes reduction processing and vectorization processing for the frame region according to the region size of the frame region.

According to an embodiment of the present invention, an image processing apparatus with shortened processing time can be provided.

Further features of the present invention will become apparent from the following description of exemplary embodiments (with reference to the attached drawings).

BRIEF DESCRIPTION OF THE DRAWINGS

FIG. 7 illustrates an example of rectangular region information in accordance with Embodiment 1.

DESCRIPTION OF THE EMBODIMENTS

Hereinafter, the present invention will be described in detail and with reference to the accompanying drawings.

<Embodiment 1>

Figure 1:
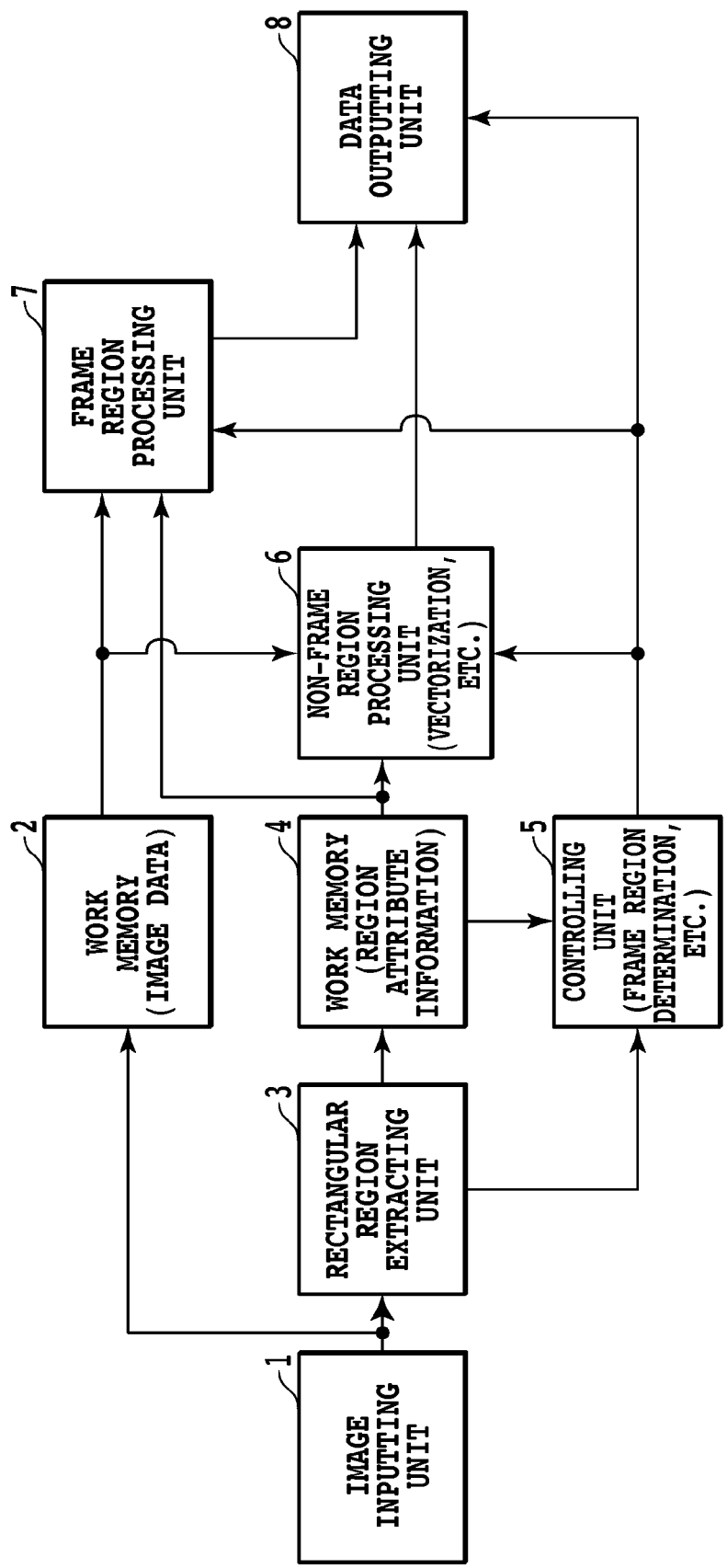
FIG. 1 is a function block diagram of an image processing apparatus in accordance with Embodiment 1.

FIG. 1 is a function block diagram of an image processing apparatus in accordance with Embodiment 1 of the present invention. In FIG. 1, image inputting unit 1 inputs paper information as a color document image using a scanner. Work memory 2 stores the color document images input from the image inputting unit 1 as input image data. Rectangular region extracting unit 3 applies frame regions and extracts text regions, photo regions, clip art regions, or similar regions from the color document image (i.e., the input image data) input from the image inputting unit 1. Work memory 4 stores region information (i.e., information related to attributes (region type), position, and size, for example) for the respective regions extracted by the rectangular region extracting unit 3. Controlling unit 5 respectively determines whether or not each region extracted by the rectangular region extracting unit 3 is a frame region or some other type of region. If a particular region extracted by the rectangular region extracting unit 3 is a frame region, then the controlling unit 5 causes that frame region to be processed after prioritizing the processing of the non-frame regions enclosed within that frame region. Non-frame region processing unit 6 processes regions that are not determined to be frame regions by the controlling unit 5. Frame region processing unit 7 processes regions that are determined to be frame regions by the controlling unit 5. On the basis of processing results from the non-frame region processing unit 6 and the frame region processing unit 7, data outputting unit 8 outputs the processing results for the input image data.

Figure 2:
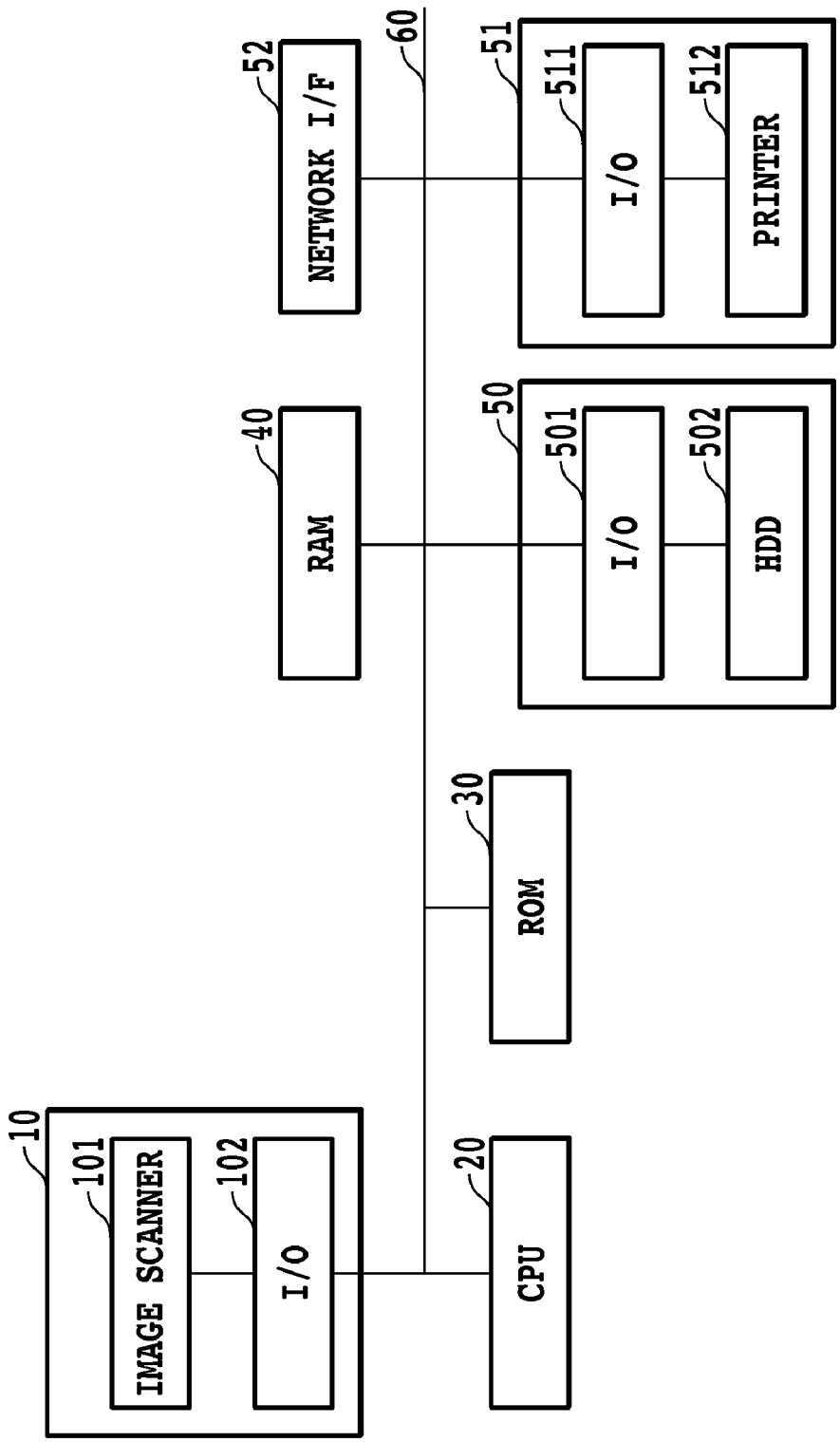
FIG. 2 is a block diagram of the image processing apparatus shown in FIG. 1.

FIG. 2 is a block diagram of the image processing apparatus shown in FIG. 1. In FIG. 2, an image scanner 101 is connected to bus 60 via an I/O 102. Additionally, the image scanner 101 and the I/O 102 are included in an image input unit 10, and realize the image inputting unit 1 in FIG. 1. A CPU 20 executes programs stored in ROM 30, and thereby realizes the rectangular region extracting unit 3, the controlling unit 5, the non-frame region processing unit 6, the frame region processing unit 7, and the data outputting unit 8 in FIG. 1. RAM 90 realizes the work memory 2 and the work memory 4 in FIG. 1, for example. Additionally, an HDD (hard disk) 502 is connected to the bus 60 via an I/O 501, and is included in an auxiliary storage unit 50. A printer 512 is connected to the bus 60 via an I/O 511, and is included in an image output apparatus 51. Additionally, the auxiliary storage unit 50, the image output apparatus 51, and a network I/F 52 are output destinations for data from the data outputting unit 8 in FIG. 1. Furthermore, in the case where image data stored in advance in the auxiliary storage unit 50 is to be the input data of the image inputting unit 1, the auxiliary storage unit 50 assumes the role of the image inputting unit 1.

Figure 3:
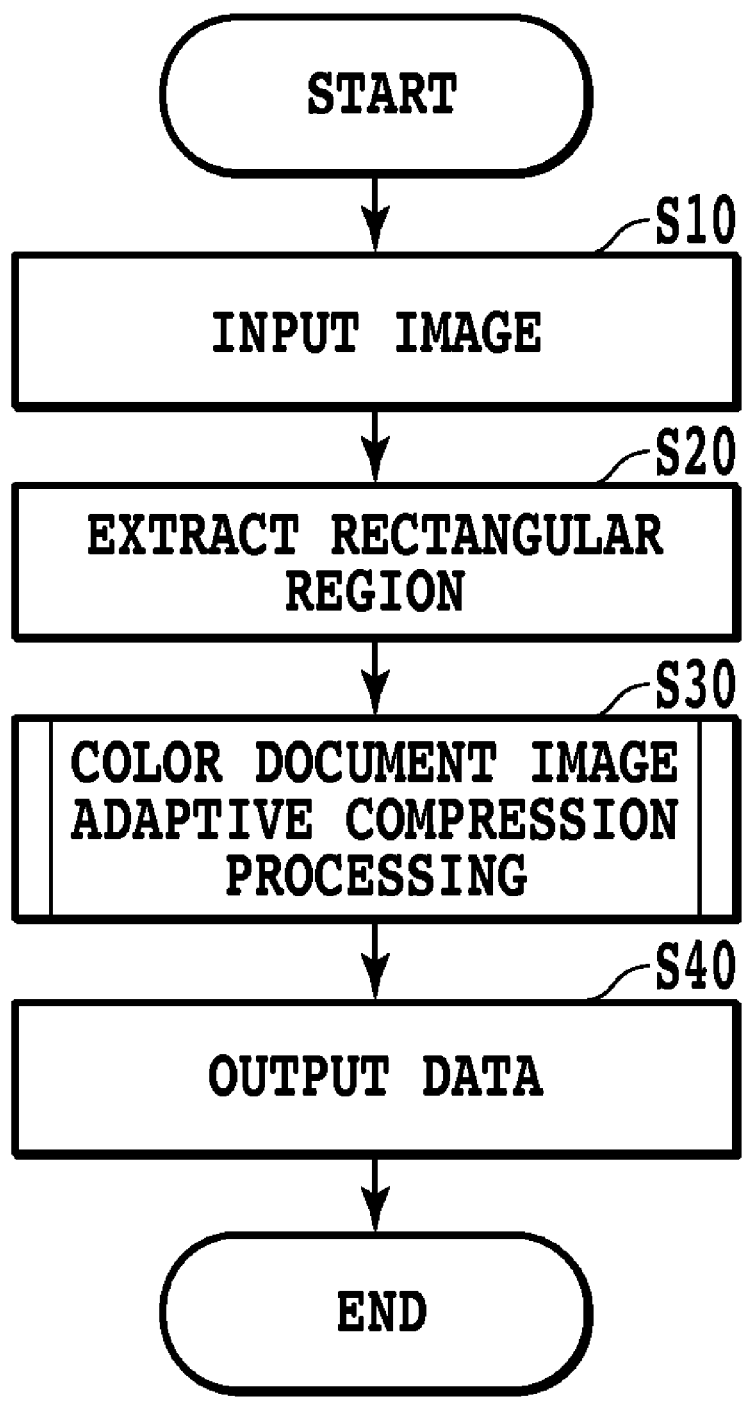
FIG. 3 is a flowchart of a process in accordance with an embodiment of the present invention.

Next, the flow of processing in the present invention will be described using the flowchart in FIG. 3. Herein, the characteristic portions in the present application are those in step S30 of FIG. 3, as well as in step S310 and steps S340 to S370 of FIG. 4, which describes step S30 in detail. Once the process is started in FIG. 3, in step S10 the CPU 20 accepts the input of a color document image by the image input unit 10. Subsequently, the CPU 20 stores the color document image input in step S10 in the work memory 2, which is reserved in a predetermined region (not shown) of the RAM 40.

Next, in step S20, the CPU 20 extracts rectangular regions from the color document image (hereinafter also simply referred to as the image data) input in step S10, by using a known method to divide the image data into regions having a plurality of different types of attributes, including a frame region attribute. The CPU 20 then generates rectangular region information for the extracted rectangular regions. Subsequently, the CPU 20 outputs the generated rectangular region information to the region of the work memory 4 in the RAM 40. Herein, rectangular region information generated in the present embodiment is shown in FIG. 7 as one example of the data format of the rectangular region information to be generated. As shown in FIG. 7, the rectangular region information includes the information described below for each of the extracted rectangular regions. The rectangular region information includes: processing status information, which indicates whether or not the adaptive processing to be hereinafter described has already been performed; and attribute information, which indicates whether the rectangular region portion is a region having the characteristics of text, a frame, graphics (including line drawings), or a photo, for example. Furthermore, the rectangular region information also includes position information expressing the position of particular regions in the input color document image. The position information may, for example, express positions with an x coordinate value for the upper-left corner, a y coordinate value for the upper-left corner, an x coordinate value for the lower-right corner, and a y coordinate value for the lower-right corner, for each region. Herein, the respective coordinate values given above may, for example, be values expressing the coordinate values of pixel positions, wherein the origin is taken to be the upper-left corner of the input image, the x-axis extends horizontally with the positive direction going to the right, and the y-axis extends vertically with the positive direction going down. In other words, the position of the pixel at the upper-left corner of the input image may be set to (0,0), for example. The width $X_i$ of the ith region can be calculated as $x_{i1}-x_{i0}+1$ (where $x_{i0}$ is the coordinate value of the upper-left corner of the ith region, and is the coordinate value of the lower-right corner of the ith region). Meanwhile, the height $Y_i$ of the ith region can be calculated as $y_{i1}-x_{i0}+1$ (where $y_{i0}$ is the coordinate value of the upper-left corner of the ith region, and is the coordinate value of the lower-right corner of the ith region). Furthermore, the area $S_i$ may be, for example, the product between the width $X_i$ and the height $Y_i$, expressed as $S_i=X_i\times Y_i=(x_{i1}-x_{i0}+1)\times(y_{i1}-x_{i0}+1)$ (Eq. 1).

Next, in step S30, the CPU 20 conducts a color document image adaptive compression process, wherein the rectangular region information generated in step S20 is referenced, and for each rectangular region, adaptive compression processing suited to the attributes of that region is applied. The color document image adaptive compression process will be described later.

Next, in step S40, the CPU 20 outputs the processed data generated by the color document image adaptive compression process in step S30. The data may be output to an auxiliary storage apparatus, or to external equipment connected via a network, for example. The series of processes is then terminated.

Figure 4:
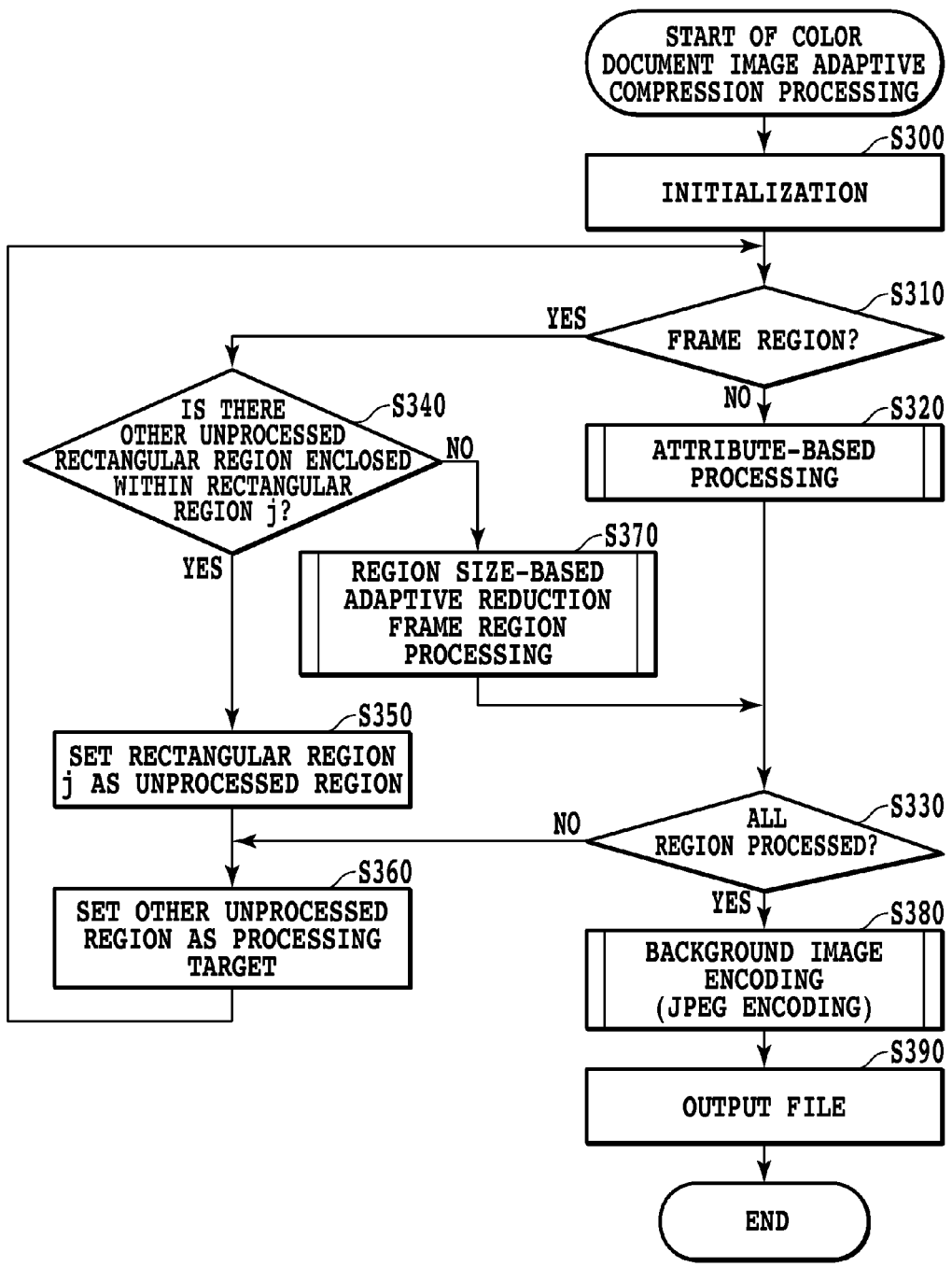
FIG. 4 is a flowchart of a color document image adaptive compression process.

Next, the color document image adaptive compression process in step S30 of the flowchart shown in FIG. 3 will be described in further detail using the flowchart shown in FIG. 4. Once the process in the flowchart shown in FIG. 4 is started, in step S300 the CPU 20 performs initialization processing, referencing both the color document image stored in the work memory 2, as well as the rectangular region information extracted from the color document image and stored in the work memory 4. In this initialization processing, the CPU 20 may sequentially initialize pointers and counters (not shown) required to conduct the processing in the subsequent steps. Such pointers and counters may be sequentially initialized for each region in the rectangular region information. Furthermore, in the initialization processing, the CPU 20 may also set all processing status information for the respective rectangular regions in the rectangular region information to N (i.e., unprocessed).

Next, in step S310, the CPU 20 references the attribute information for the rectangular region j currently set as the processing target from among the rectangular region information described earlier using FIG. 7. In so doing, the CPU 20 determines whether or not the current rectangular region is a frame region. If it is determined in step S310 that the rectangular region is a frame region, then the process proceeds to step S340. If it is determined in step S310 that the rectangular region is not a frame region, and is instead a text region, graphics region, or photo region, then the process proceeds to step S320.

In step S340, the CPU 20 determines whether or not there exists another unprocessed rectangular region enclosed within the rectangular region j that was determined to be a frame region in step S310. If it is determined in step S340 that another unprocessed rectangular region does exist, then the process proceeds to step S350. If it is determined in step S340 that another unprocessed rectangular region does not exist, then the process proceeds to step S370. At this point, the CPU 20 determines whether or not there exists a rectangular region other than the rectangular region j with a processing status set to N (i.e., unprocessed) by referencing the processing status information of each rectangular region. Subsequently, the CPU 20 determines whether or not an unprocessed rectangular region is enclosed within the rectangular region j by, for example, using the coordinate values for the unprocessed rectangular region. For example, the CPU 20 may determine that an unprocessed rectangular region is enclosed within the rectangular region j in the case where the following condition 1 and condition 2 are satisfied. Herein, the condition 1 is the case wherein the x coordinate value of the upper-left corner of the unprocessed region is equal to or greater than the x coordinate value of the upper-left corner of the rectangular region j, and wherein the y coordinate value of the upper-left corner of the unprocessed rectangular region is equal to or greater than the y coordinate value of the upper-left corner of the rectangular region j. The condition 2 is the case wherein the x coordinate value of the lower-right corner of the unprocessed region is less than or equal to the x coordinate value of the lower-right corner of the rectangular region j, and wherein the y coordinate value of the lower-right corner of the unprocessed rectangular region is less than or equal to the y coordinate value of the lower-right corner of the rectangular region j.

In step S350, the CPU 20 sets the processing status information of the rectangular region j to N (i.e., unprocessed).

In step S360, the CPU 20 newly sets a rectangular region with a processing status of N (i.e., unprocessed) as the processing target from among the rectangular regions, excluding the rectangular region that was set as the processing target in step S330 or step S340. The process then returns to step S310.

In step S370, the CPU 20 conducts a region size-based adaptive reduction frame region process for the rectangular region j set as the processing target. The steps in this process will be later described in detail using the flowchart shown in FIG. 6. During the processing in step S370, the processing status information for the rectangular region set as the current processing target is set to Y (i.e., processed) by the CPU 20. The process then proceeds to step S330.

Meanwhile in step S320, the CPU 20 conducts an attribute-based process that executes processing respectively suited to the text regions, graphics regions, and photo regions that are not frame regions. The steps in the attribute-based process will be later described in detail using the flowchart shown in FIG. 5. During the processing in step S320, the processing status information for the rectangular region set as the current processing target is set to Y (i.e., processed). The process then proceeds to step S330.

In step S330, the CPU 20 determines whether or not all rectangular regions have been processed. The determination is made not just for the rectangular region j set as the current processing target, but for all rectangular regions contained in the rectangular region information. The CPU 20 makes the determination by checking the processing status information for each rectangular region. If it is determined in step S330 that not just the rectangular region j set as the current processing target, but all rectangular regions contained in the rectangular region information have been processed, then the process proceeds to step S380. If it is determined in step S330 that not all rectangular regions contained in the rectangular region information besides the rectangular region j set as the current processing target have been processed, then the process proceeds to step S360.

In step S380, the CPU 20, using technology of the related art, encodes the underlying image (i.e., background image) using the known JPEG format. The underlying image is the result obtained by filling in regions having various types of attributes, such as text regions, clip art, or similar graphics regions. The process then proceeds to step S390.

In step S390, the CPU 20 outputs the processing results from step S320, step S370, and step S380 as file of the processing results for the image data that was input in step S10. The series of processes is then terminated.

Figure 5:
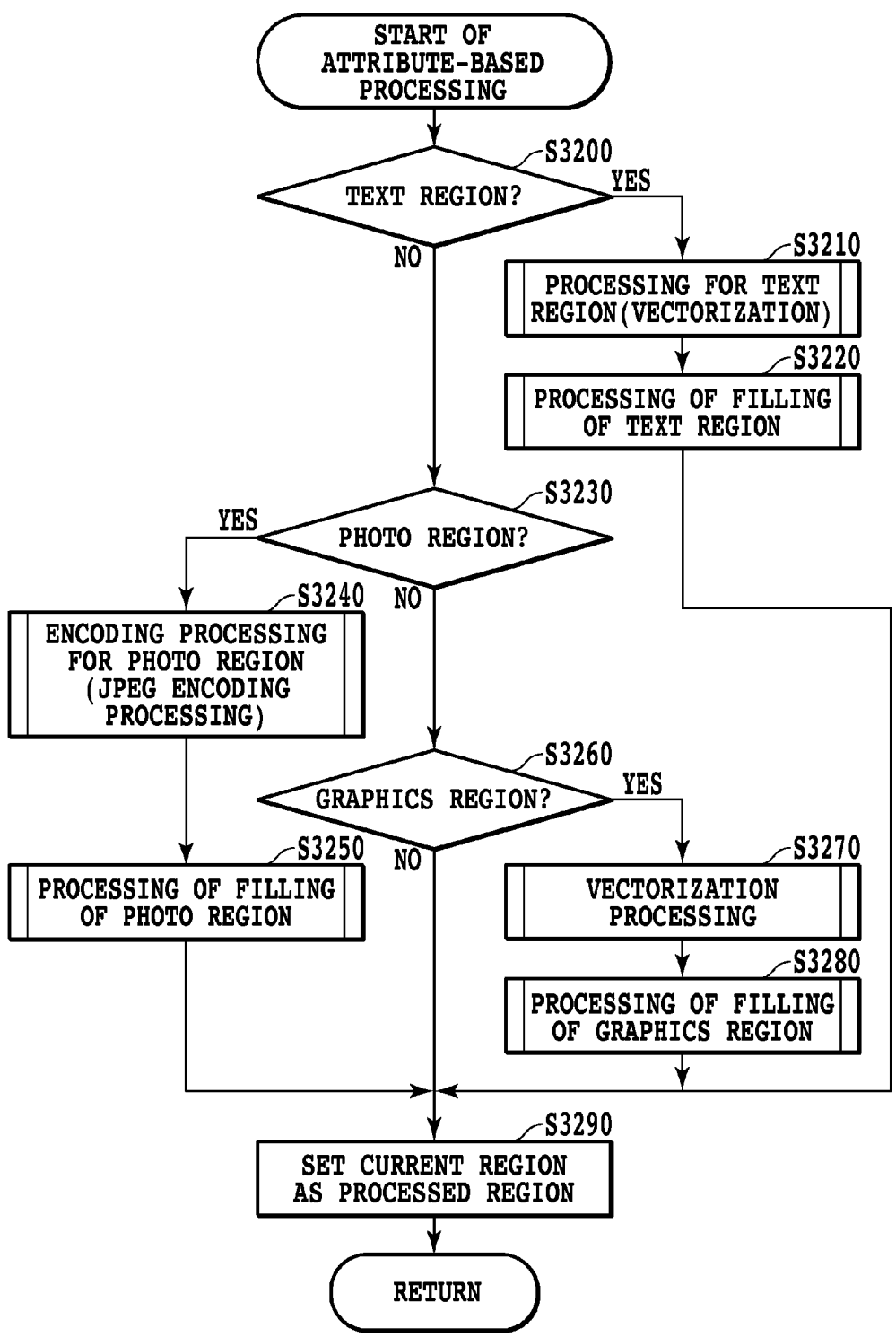
FIG. 5 is a flowchart of processing based on attributes.

Next, the attribute-based process conducted in step S320 will be described using the flowchart shown in FIG. 5. When the process in FIG. 5 is started, in step S3200, the CPU 20 determines whether or not the rectangular region set as the current processing target is a text region by referencing the attribute information for that rectangular region. If it is determined in step S3200 that the rectangular region is a text region, then the process proceeds to step S3210. If it is determined in step S3200 that the rectangular region is not a text region, then the process proceeds to step S3230.

In step S3210, the CPU 20 conducts processing for text region (i.e., text vectorization processing) for the rectangular region set as the current processing target.

Next, in step S3220, the CPU 20 conducts processing of filling of the text region, and the process proceeds to step S3290.

Herein, the text vectorization processing in step S3210, as well as the processing of filling of a text region in step S3220, are realized using known processes.

In step S3230, the CPU 20 determines whether or not the rectangular region set as the current processing target is a photo region by referencing the attribute information for that rectangular region. If it is determined in step S3230 that the rectangular region is a photo region, then the process proceeds to step S3240. If it is determined in step S3230 that the rectangular region is not a photo region, then the process proceeds to step S3260.

In step S3290, the CPU 20 conducts photo region encoding processing (i.e., JPEG encoding) for the rectangular region set as the current processing target.

Next, in step S3250, the CPU 20 conducts processing of filling of the photo region.

Herein, the photo region JPEG encoding processing in step S3240, as well as the processing of filling of a photo region in step S3250, are realized using known processes.

In step S3260, the CPU 20 determines whether or not the rectangular region set as the current processing target is a graphics (i.e., clip art) region by referencing the attribute information for that rectangular region. If it is determined in step S3260 that the rectangular region is a graphics (clip art) region, then the process proceeds to step S3270. If it is determined in step S3260 that the rectangular region is not a graphics (clip art) region, then the process proceeds to step S3290.

In step S3270, the CPU 20 conducts graphics (clip art) region processing (i.e., vectorization processing) for the rectangular region set as the current processing target.

Next, in step S3280, the CPU 20 conducts processing of filling of the graphics (clip art) region. The process then proceeds to step S3290.

Herein, the graphics (clip art) region vectorization processing in step S3270, as well as the processing of filling of a graphics (clip art) region in step S3280, are realized using known processes.

In step S3290, the CPU 20 ends the series of processing in the attribute-based process shown in the flowchart in FIG. 5 with the processing status information set to Y (i.e., processed) for the rectangular region set as the current processing target. In so doing, the CPU 20 completes the processing in step 3320 of FIG. 4.

Figure 6:
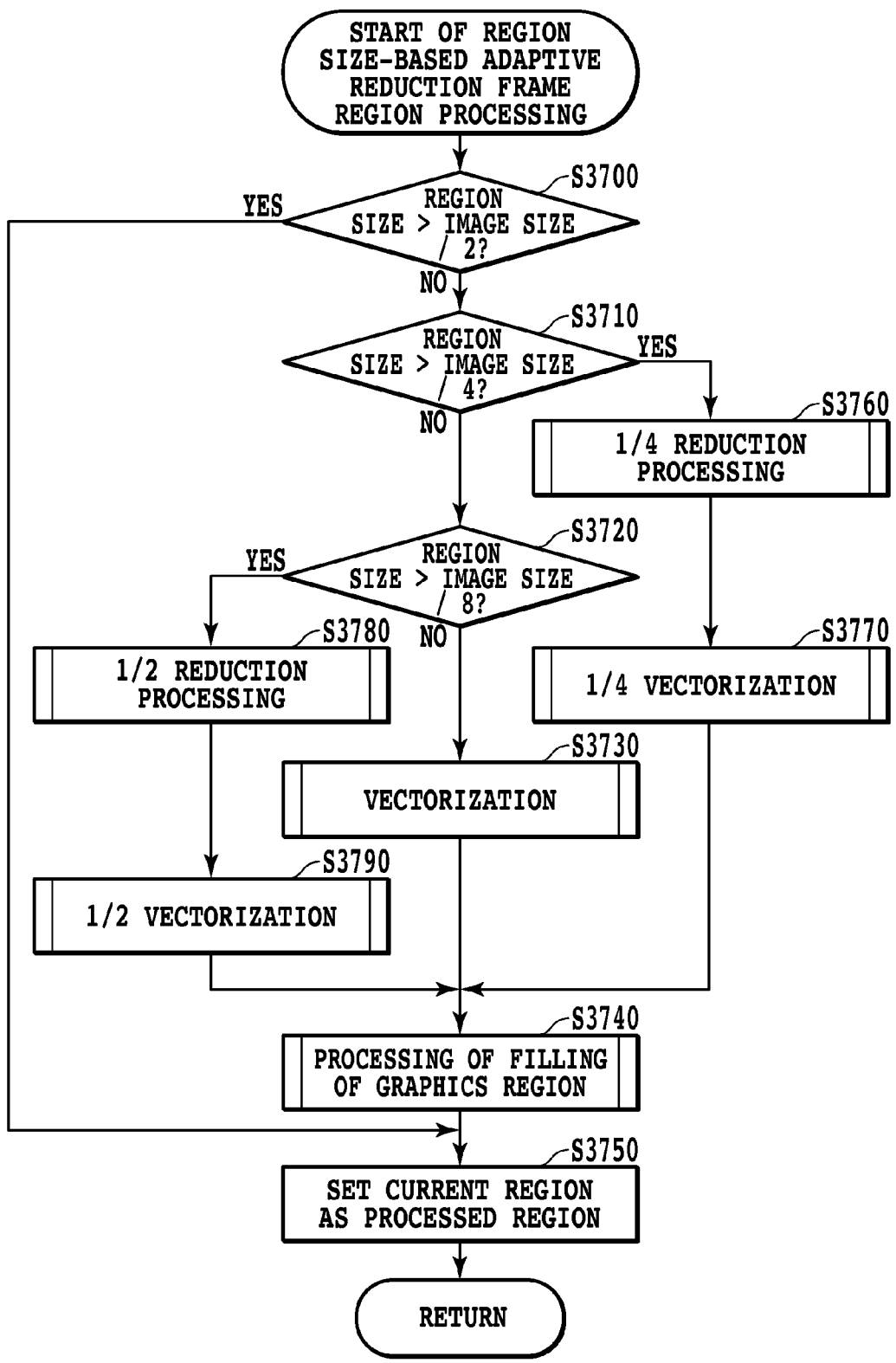
FIG. 6 is a flowchart of a region size-based adaptive reduction frame region process.

Next, the region size-based adaptive reduction frame region process executed in step 3370 of FIG. 4 will be described using the flowchart in FIG. 6. Once the process in FIG. 6 is started, in step S3700 the CPU 20 determines whether or not the region size of the rectangular region set as the current processing target is greater than ½ the image size of the input image. If it is determined in step S3700 that the region size of the rectangular region set as the current processing target is greater than ½ the image size of the input image, then the process proceeds to step S3750. Also, neither reduction processing nor vectorization processing are performed for that rectangular region. If it is determined in step S3700 that the region size of the rectangular region set as the current processing target is not greater than ½ the image size of the input image, then the process proceeds to step S3710.

In step S3710, the CPU 20 determines whether or not the region size of the rectangular region set as the current processing target is greater than ¼ the image size of the input image. If it is determined in step S3710 that the region size of the rectangular region set as the current processing target is greater than ¼ the image size of the input image, then the process proceeds to step S3760. In this case, the rectangular region is greater than ¼ the image size of the input image, while also less than or equal to ½ the image size. If it is determined in step S3710 that the region size of the rectangular region set as the current processing target is not greater than ¼ the image size of the input image, then the process proceeds to step S3720.

In step S3760, the CPU 20 performs known processing to reduce the image data in the current region to ¼ original size, such as by simple pixel sampling, or by taking the average values of 4×4 blocks of 16 pixels, for example. The reduced image thus obtained is then stored in a temporary storage area (not shown) in the RAM 40.

Next, in step S3770, the CPU 20 vectorizes the reduced image that was stored in the RAM 40 in step S3760. Subsequently, the CPU 20 conducts a ¼ vectorization process, wherein the CPU 20 multiplies the coordinate values of the vectorized result obtained above by a factor of 4, and then processes vector data containing the coordinate data obtained by processing the original size image. The process then proceeds to step S3740.

In step S3720, the CPU 20 determines whether or not the region size of the rectangular region set as the current processing target is greater than ⅛ the image size. If it is determined in step S3720 that the region size of the rectangular region set as the current processing target is greater than ⅛ the image size, then the process proceeds to step S3780. In this case, the rectangular region is greater than ⅛ the image size, while also less than or equal to ¼ the image size. If it is determined in step S3720 that the region size of the rectangular region set as the current processing target is not greater than ⅛ the image size, then the process proceeds to step S3730. In this case, the CPU 20 advances the process to step S3730 without performing reduction processing or vectorization processing.

In step S3780, the CPU 20 performs known processing to reduce the image data in the current region to ½ original size, such as by simple pixel sampling, or by taking the average values of 2×2 blocks of 4 pixels, for example. The reduced image thus obtained is then stored in a temporary storage area (not shown) in the RAM 40. Next, in step S3790, the CPU 20 vectorizes the reduced image that was stored in the RAM 40 in step S3780. Subsequently, the CPU 20 conducts a ½ vectorization process, wherein the CPU 20 multiplies the coordinate values of the vectorized result obtained above by a factor of 2, and then processes vector data containing the coordinate data obtained by processing the original size image. The process then proceeds to step S3740.

In step S3730, the CPU 20 vectorizes the rectangular region set as the current processing target at its original region size. The process then proceeds to step S3740.

In step S3740, the CPU 20 conducts processing of filling of processing for the frame region that was vectorized in step S3770, step S3790, or step S3730. The processing of filling herein is conducted using a technique similar to that of the processing of filling of the graphics (clip art) regions described earlier.

Next, in step S3750, the CPU 20 ends the series of processing in the region size-based adaptive reduction frame region process shown in the flowchart in FIG. 6 with the processing status information set to Y (i.e., processed) for the rectangular region set as the current processing target, similarly to the processing in step S3290. In so doing, the CPU 20 completes the processing in step S370 of FIG. 4.

In the foregoing, the CPU 20 may, for example, use the above Eq. 1 to compute the region size of the rectangular region set as the current processing target. Additionally, when accepting the input of image data in step S10, the CPU 20 may obtain the size of the image data using a known method, and then store the size information in an area (not shown) of the RAM 40.

According to the embodiment described in the foregoing, suitable processing economizing reduction and vectorization is performed for a rectangular region contained in a color document image, according to the attributes and size of the rectangular region. In so doing, the processing time can be shortened.

<Embodiment 2>

In the foregoing Embodiment 1, the processing status information of the entire rectangular region information is referenced each time in order to search for unprocessed rectangular regions. However, the present invention is not limited thereto, and information on processed rectangular regions may also be successively deleted from the rectangular region information or updated. In so doing, processing to update the rectangular region information becomes necessary, but the time searching for unprocessed rectangular regions can be shortened.

<Embodiment 3>

In the foregoing embodiments, it is assumed that the input image is to be processed as a document image obtained by a scanner. However, the present invention is not limited thereto, and the input image may also be an image shot by a document camera or similar device, or a still image obtained by capturing video data shot by a video camera or similar device.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-100189, filed Apr. 16, 2009, which is hereby incorporated by reference herein in its entirety.

What is claimed is:

1. An image processing apparatus, comprising:
an image inputting unit that inputs an image;
a region division unit that generates region information by dividing an input image input by the image inputting unit into regions having a plurality of different types of attributes, wherein the plurality of different types of attributes includes a frame region attribute;
a non-frame region processing unit that obtains data of respective regions other than frame regions by applying attribute-specific processing for respective regions, excluding frame regions, included in the input image on the basis of the input image and the region information, and executes processing of filling of the processed regions; and
a frame region processing unit that executes reduction processing and vectorization processing for the frame region according to the region size of the frame region;
wherein the frame region processing unit determines whether or not to execute the reduction processing and the vectorization processing for the frame region by comparing the size of the frame region to the size of the input image,
and wherein the non-frame region processing unit processes regions with other attributes enclosed within a frame region of the input image before the frame region is processed by the frame region processing unit.

2. The image processing apparatus according to claim 1, wherein the plurality of different types of attributes includes attributes targeted for vectorization, and the non-frame region processing unit includes a vectorization unit for vectorizing regions having the attributes targeted for vectorization.

3. The image processing apparatus according to claim 1, further comprising:
a background image encoding unit that obtains background image data by encoding a background image after processing has been conducted by the non-frame region processing unit and the frame region processing unit;
an output unit that outputs a file containing data for regions other than frame regions that was obtained by the non-frame region processing unit, frame region vector data obtained in the case where vectorization processing is conducted by the frame region processing unit, and background image data obtained by the background image encoding unit.

4. The image processing apparatus according to claim 1, wherein in the case where the size of the frame region is greater than a first reference determined on the basis of the size of the input image, the frame region processing unit performs control such that reduction processing and vectorization processing are not executed for the frame region.

5. The image processing apparatus according to claim 4, wherein
in the case where the size of the frame region is less than or equal to the first reference, and greater than a second reference determined on the basis of the size of the input image, the frame region processing unit executes a first reduction processing and a first vectorization processing for the frame region,
in the case where the size of the frame region is less than or equal to the second reference, and greater than a third reference determined on the basis of the size of the input image, the frame region processing unit executes a second reduction processing and a second vectorization processing for the frame region, and
in the case where the size of the frame region is less than or equal to the third reference, the frame region processing unit executes vectorization processing for the frame region, without conducting reduction processing.

6. The image processing apparatus according to claim 5, wherein
the first reference is ½ the size of the input image,
the second reference is ¼ the size of the input image, and
the third reference is ⅛ the size of the input image.

7. The image processing apparatus according to claim 1, wherein the frame region processing unit executes processing of filling of the frame region in the case where vectorization processing is executed for the frame region.

8. The image processing apparatus according to claim 1, wherein the image input by the image inputting unit is a color document image.

9. An image processing method, comprising the steps of:
conducting region division that generates region information by dividing an input image into regions having a plurality of different types of attributes, wherein the plurality of different types of attributes includes a frame region attribute;
conducting non-frame region processing that obtains data of respective regions other than frame regions by applying attribute-specific processing for respective regions, excluding frame regions, included in the input image on the basis of the input image and the region information, and executes processing of filling of the processed regions; and
conducting frame region processing that executes reduction processing and vectorization processing for the frame region according to the region size of the frame region;
wherein, in the frame region processing step, it is determined whether or not to execute the reduction processing and vectorization processing for the frame region by comparing the size of the frame region to the size of the input image,
and wherein, in the non-frame region processing step, regions with other attributes enclosed within a frame region of the input image are processed before the frame region is processed in the frame region processing step.

10. A non-transitory computer-readable storage medium storing a program that causes a computer to execute the steps of:
conducting region division that generates region information by dividing an input image into regions having a plurality of different types of attributes, wherein the plurality of different types of attributes includes a frame region attribute;
conducting non-frame region processing that obtains data of respective regions other than frame regions by applying attribute-specific processing for respective regions, excluding frame regions, included in the input image on the basis of the input image and the region information, and executes processing of filling of the processed regions; and
conducting frame region processing that executes the reduction processing and vectorization processing for the frame region according to the region size of the frame region;
wherein, in the frame region processing step, it is determined whether or not to execute reduction processing and vectorization processing for the frame region by comparing the size of the frame region to the size of the input image,
and wherein, in the non-frame region processing step, regions with other attributes enclosed within a frame region of the input image are processed before the frame region is processed in the frame region processing step.

* * * * *